(12) United States Patent
Håkansson et al.

(10) Patent No.: US 9,100,973 B2
(45) Date of Patent: Aug. 4, 2015

(54) ANTENNA SELECTION FOR COEXISTENCE OF MULTIPLE RADIO INTERFACES

(71) Applicants: Pär Håkansson, Malmö (SE); Patrik Lundell, Svedala (SE); Johan Lundqvist, Lund (SE)

(72) Inventors: Pär Håkansson, Malmö (SE); Patrik Lundell, Svedala (SE); Johan Lundqvist, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 79 days.

(21) Appl. No.: 13/680,823

(22) Filed: Nov. 19, 2012

(65) Prior Publication Data

US 2014/0140224 A1    May 22, 2014

(51) Int. Cl.
 *H04B 17/00* (2006.01)
 *H04W 88/02* (2009.01)
 *H04W 72/08* (2009.01)
 *H04B 7/06* (2006.01)

(52) U.S. Cl.
 CPC ........... *H04W 72/085* (2013.01); *H04B 7/0608* (2013.01); *H04B 7/0691* (2013.01)

(58) Field of Classification Search
 USPC .................................... 370/229, 230, 252, 255
 See application file for complete search history.

(56) References Cited

U.S. PATENT DOCUMENTS

| 2011/0249760 | A1* | 10/2011 | Chrisikos et al. | 375/259 |
| 2011/0250926 | A1* | 10/2011 | Wietfeldt et al. | 455/525 |
| 2011/0312288 | A1* | 12/2011 | Fu et al. | 455/88 |
| 2012/0115553 | A1* | 5/2012 | Mahe et al. | 455/575.7 |

FOREIGN PATENT DOCUMENTS

WO    2011084715 A1    7/2011

* cited by examiner

*Primary Examiner* — Edan Orgad
*Assistant Examiner* — Sithu Ko
(74) *Attorney, Agent, or Firm* — Coats & Bennett, PLLC

(57) ABSTRACT

A wireless communication device comprises a wide area transceiver, an auxiliary receiver, a plurality of antennas for use by said auxiliary receiver and said wide area transceiver, and an antenna selection circuit. The antenna selection circuit selects an antenna configuration for the auxiliary receiver and the wide area transceiver. The antenna selection circuit is configured to measure a link quality for one or more of antennas used by the auxiliary receiver, and select an antenna configuration for the wide area transceiver based on the link quality measurements for the auxiliary receiver.

6 Claims, 6 Drawing Sheets

ANTENNA SELECTION FOR COEXISTENCE OF MULTIPLE RADIO INTERFACES

TECHNICAL FIELD

The present invention relates generally to mobile communication devices and, more particularly, to antenna selection in a mobile communication device having multiple radio interfaces.

BACKGROUND

Mobile communication devices are evolving towards small platforms that incorporate multiple radio interfaces. For example, a smartphone or other hand-held device may include a cellular transceiver (e.g., GSM/WCDMA/LTE) to communicate with a base station in a wireless communication network, a wireless local area network (WLAN) transceiver (e.g., WiFi) for communicating with access nodes in local area network (LAN), and a Bluetooth transceiver for communicating with other nearby devices. Each radio transceiver requires one or more antennas. Given the inherent space limitations, it is difficult to provide complete isolation between the antennas for the different radio interfaces. Therefore the coexistence of different radio interfaces in a single device poses new design challenges.

One problem is that the cellular transmitter can desensitize the WLAN receiver and Bluetooth receiver when operating at high transmit power levels. The desensitization of the WLAN and Bluetooth receivers can be in the range of 20-30 dB, severely degrading the link quality and throughput of these systems. Such desensitization depends to some extent on the efficiency of the filters (e.g., surface acoustic wave (SAW) or bulk acoustic wave/film bulk acoustic resonator (BAW/FBAR)) in the cellular transmitter and WLAN/Bluetooth receiver chains, but also to a large extent on the isolation between the antennas used. Because the antenna performance and isolation can vary widely due to normal activities of the user, it is difficult to design devices that provide the necessary isolation between antennas in all circumstances.

One way to avoid desensitization is to limit usage of the WLAN and Bluetooth interfaces to times when the cellular transmitter is not operating. However, it is desirable from a consumer perspective to enable simultaneous use of the WLAN and Bluetooth receivers with the cellular transmitter.

SUMMARY

Embodiments of the present invention provide methods and apparatus to improve antenna isolation for simultaneous operation of multiple radio interfaces. In one exemplary embodiment, the techniques described herein are used to select an antenna configuration that allows the simultaneous use of an auxiliary receiver with a cellular transceiver. The auxiliary receiver may comprise a WLAN receiver, Bluetooth receiver, GPS receiver, or near filed communication (NFC) receiver. The auxiliary receiver may be part of a transceiver unit, e.g. WLAN transceiver or BLUETOOTH transceiver. When multiple radio interfaces are in use, the antennas used by the radio interfaces may be swapped to provide the best isolation, and thus the best link quality, for the WLAN and Bluetooth receivers. The input for choosing the most favorable antenna configuration is the the link quality measured by the auxiliary receiver. This measurement is constantly ongoing while the auxiliary receiver is active. The antenna configuration that gives the best link quality for the auxiliary receiver is selected.

Exemplary embodiments of the invention comprise methods of antenna selection in a wireless communication device having an auxiliary receiver, a wide area transceiver, and a plurality of selectable antennas. In one exemplary embodiment, the method comprises measuring link quality for one or more antennas used by the auxiliary receiver, and selecting an antenna configuration for the wide area transceiver based on the link quality measurements for the auxiliary receiver.

In some embodiments of the method, measuring link quality for one or more antennas used by the auxiliary receiver comprises measuring link quality for a first antenna used by the auxiliary receiver for each of two or more possible antenna configurations for the wide area transceiver.

In some embodiments of the method, selecting an antenna configuration for the wide area transceiver comprises selecting a transmit antenna for the wide area transceiver that provides the best link quality for an antenna used by the auxiliary receiver.

In some embodiments of the method, measuring link quality for one or more antennas used by the auxiliary receiver comprises measuring link quality for each of two or more antennas.

In some embodiments of the method, selecting an antenna configuration for the wide area transceiver comprises selecting at least one antenna for use by the auxiliary receiver, and selecting a transmit antenna for the wide area transceiver from the remaining antennas not selected for use by the auxiliary receiver.

In some embodiments of the method, the wide area transceiver comprises a multicarrier transceiver, and selecting an antenna configuration for the wide area transceiver comprises selecting a transmit antenna for each carrier.

Other embodiments of the invention comprise a wireless communication device. One exemplary communication device comprises a wide area transceiver; a auxiliary receiver; a plurality of selectable antennas for use by said auxiliary receiver and said wide area transceiver; and an antenna selection circuit for selecting an antenna configuration for said auxiliary receiver and said wide area transceiver. The antenna selection circuit is configured to measure a link quality for one or more of antennas used by the auxiliary receiver, and select an antenna configuration for the wide area transceiver based on the link quality measurements for the auxiliary receiver.

In some embodiments of the wireless communication device, the antenna selection circuit is configured to measure link quality for one or more antennas used by the auxiliary receiver by measuring link quality for a first antenna used by the auxiliary receiver for each of two or more possible antenna configurations for the wide area transceiver.

In some embodiments of the wireless communication device, the antenna selection circuit is configured to select an antenna configuration for the wide area transceiver by selecting a transmit antenna for the wide area transceiver that provides the best link quality for an antenna used by the auxiliary receiver.

In some embodiments of the wireless communication device, the antenna selection circuit is configured to measure link quality for one or more antennas used by the auxiliary receiver by measuring link quality for each of two or more antennas.

In some embodiments of the wireless communication device, the antenna selection circuit is configured to select an antenna configuration for the wide area transceiver by selecting at least one antenna for use by the auxiliary receiver, and selecting a transmit antenna for the wide area transceiver from the remaining antennas not selected for use by the auxiliary receiver.

In some embodiments of the wireless communication device, the wide area transceiver comprises a multicarrier transceiver, and the antenna selection circuit is configured to select an antenna configuration for the wide area transceiver by selecting a transmit antenna for each carrier.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 illustrates an exemplary wireless communication device according to a second embodiment of the invention.

DETAILED DESCRIPTION

Figure 1:
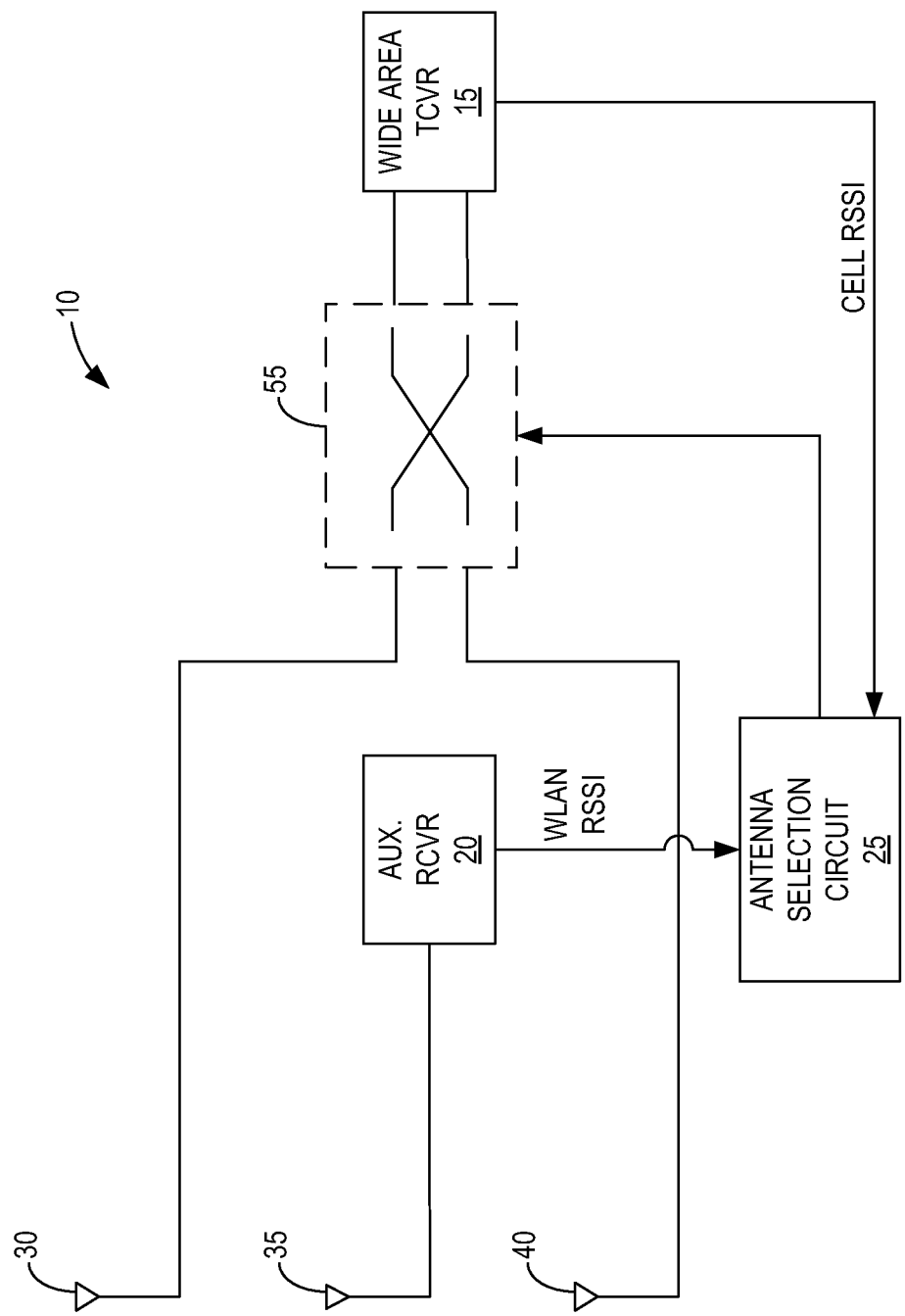
FIG. 1 illustrates an exemplary wireless communication device according to a first embodiment of the invention.

FIG. 1 illustrates a wireless communication device 10 according to one exemplary embodiment. The wireless communication device 10 comprises a wide area transceiver 15, auxiliary receiver 20, and antenna selection circuit 25. The wide area transceiver 15 may, for example, comprise a cellular transceiver configured to operate according to LTE, WCDMA, or another wireless communication standard. The auxiliary receiver 20 may, for example, comprise a wireless local area network (WLAN) receiver configured to operate according to the 802.11 family of standards, a BLUETOOTH receiver, a Global Positioning System (GPS) receiver, or near field communications (NFC) receiver. The auxiliary transceiver 20 may be part of a transceiver unit, e.g. WLAN transceiver or BLUETOOTH transceiver. The wide area transceiver 15 couples to both antennas 30 and 40 via switch 55. The auxiliary receiver 20 couples to antenna 35. The antenna selection circuit 25 receives signal quality measurements from the wide area transceiver 15 and the auxiliary receiver 20 and determines an antenna configuration that provides the best isolation for the auxiliary receiver 20. The antenna selection circuit 25 may be implemented, for example, by a microprocessor or other processing circuit present in the mobile communication device 10.

In the embodiment shown in FIG. 1, the auxiliary receiver 20 uses a single dedicated antenna 35, and the wide area transceiver 15 uses two antennas 30 and 40. One of the antennas 30 or 40 is used as a primary transmit/receive antenna. The other one of the antennas 30 or 40 is used as a receive antenna to provide receive diversity. The antenna selection circuit 25 may select either one of the antennas 30 and 40 for use as the transmit/receive antenna. The other antenna 30 or 40 may be used as a second receive antenna when operating in diversity mode.

When the wide area transceiver 15 and auxiliary receiver 20 are being used simultaneously, the auxiliary receiver 20 provides signal quality measurements to the antenna selection circuit 25. The signal quality measurements may, for example, comprise signal strength measurements, e.g. received signal strength indication (RSSI) measurements. In other embodiments, the signal quality measurements may comprise signal-to-noise ratios (SNRs) or signal-to-interference-plus-noise ratios (SINRs). During the antenna selection process, the wide area transceiver 15 may alternatively switch between antennas 30 and 40 as the transmit antenna so that RSSI measurements can be obtained for each antenna configuration. The antenna selection circuit 25 may select the antenna 30 or 40 that provides the best signal quality, e.g. highest RSSI, as the transmit antenna for the wide area transceiver 15.

Figure 2:
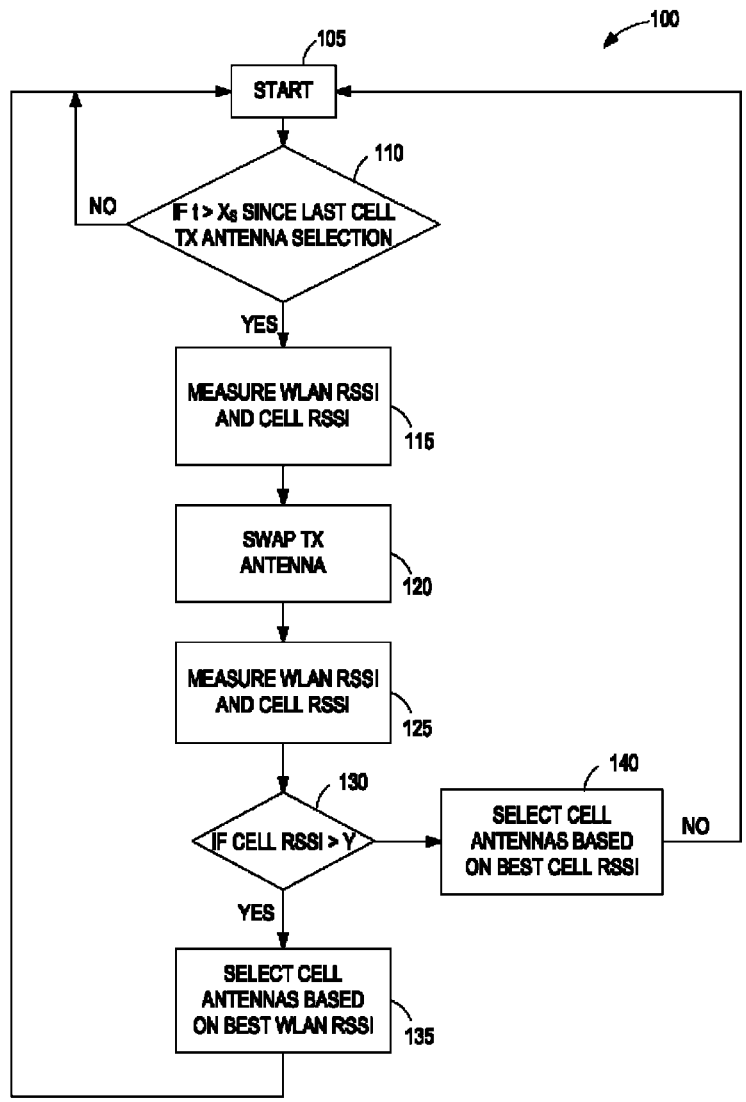
FIG. 2 illustrates an exemplary antenna selection procedure implemented in the first embodiment.

FIG. 2 Illustrates an exemplary antenna selection procedure 100 implemented by the antenna selection circuit 25 in the embodiment shown in FIG. 1. The procedure starts (block 105) when the auxiliary receiver 20 is enabled and the wide area transceiver 15 is operating on a band that could cause coexistence issues for the auxiliary receiver 20. The antenna selection processor 25 determines whether it is time to make a new antenna selection (block 110). For example, the antenna selection circuit 25 may be configured to select a new antenna configuration at a periodic interval on the order of once every few seconds. If the time has arrived for selecting a new antenna configuration, the antenna selection circuit 25 requests RSSI measurements from the wide area transceiver 15 and auxiliary receiver 20 for a first antenna configuration (block 115). In this example, it is assumed that antenna 30 functions as the primary transmit/receive antenna in the first antenna configuration. After receiving the RSSI measurements, the antenna selection circuit selects the second antenna configuration (block 120). In the second antenna configuration, antenna 40 functions as the primary transmit/receive antenna. The antenna selection circuit 25 then requests RSSI measurements from both the wide area transceiver 15 and auxiliary receiver 20 for the second antenna configuration (block 125). After receiving the RSSI measurements for the second antenna configuration, the antenna selection circuit 25 checks whether the RSSI for the wide area transceiver 15 is above a threshold Y for each antenna configuration (block 130). In some embodiments, the threshold Y may represent the minimum RSSI needed for camping on a serving cell. In other embodiments, the threshold Y may be varied based on the user scenario. For example, if the user is streaming video from a cellular network and retransmitting the video to a TV, then Y should be set to provide enough throughput for the wide area transceiver 15. In this case, the threshold Y will be greater than the minimum value required for camping. If the RSSI for the wide area transceiver 15 is above the threshold Y for both antenna configurations, the antenna selection circuit 25 selects, for the wide area transceiver 15, the antenna configuration that provides highest RSSI for the auxiliary receiver 20 (block 135). Otherwise, the antenna selection circuit 25 selects, for the wide area transceiver 15, the antenna configuration that provides the highest RSSI for the wide area transceiver 15 (block 140).

Figure 3:
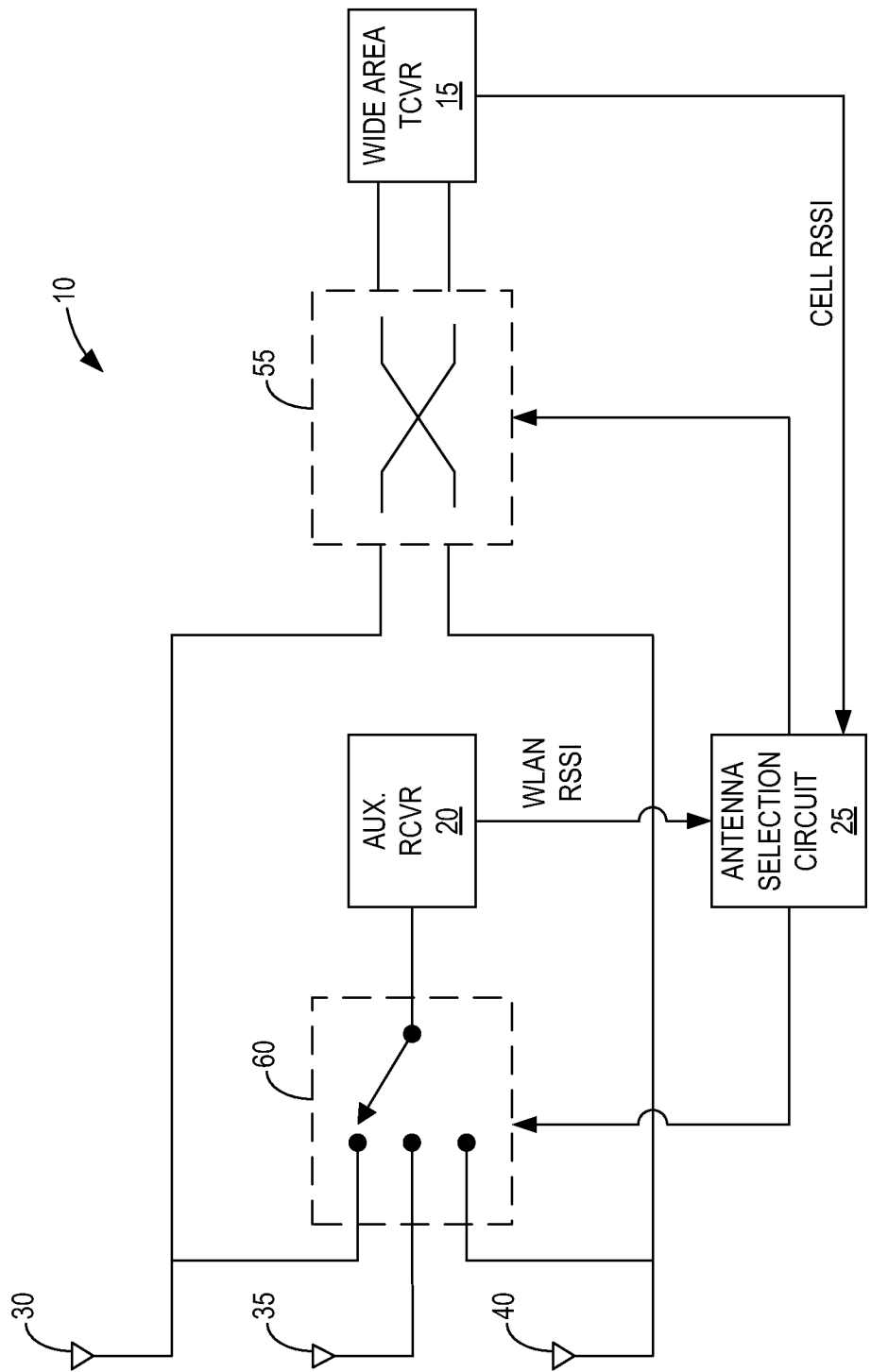

FIG. 3 illustrates a wireless communication device 10 according a second embodiment. The second embodiment is similar to the first embodiment, and similar reference numbers are therefore used to indicate similar components. The wireless communication device 10 comprises a wide area transceiver 15, auxiliary receiver 20, and an antenna selection circuit 25. The wide area transceiver 15 may, for example, comprise a cellular transceiver configured to operate according to the Long Term Evolution (LTE) standard, the Wideband Code Division Multiple Access (WCDMA) standard, or another wireless communication standard. The auxiliary receiver 20 may, for example, comprise a wireless local area network (WLAN) receiver configured to operate according to the 802.11 family of standards, a BLUETOOTH receiver, a Global Positioning System (GPS) receiver, or near field communications (NFC) receiver. The auxiliary receiver 20 may be art of a transceiver unit, e.g. WLAN transceiver or BLUETOOTH transceiver. The wide area transceiver 15 couples to one or both of antennas 30 and 40 via switch 55. The auxiliary receiver 20 couples to any one of antennas 30, 35, and 40 via switch 60. The antenna selection circuit 25 receives signal quality measurements from the wide area transceiver 15 and the auxiliary receiver 20, and determines an antenna configuration that provides the best isolation for the auxiliary receiver 20. The antenna selection circuit 25 may be implemented, for example, by a microprocessor or other processing circuit present in the mobile communication device 10.

In the embodiment shown in FIG. 3, the auxiliary receiver 20 uses a single transmit/receive antenna. The antenna selection circuit 25 may select any one of the three available antennas for use by the auxiliary receiver 20. The wide area transceiver 15 uses one transmit antenna and either one or two receive antennas depending on the selected antenna configuration. The use of two antennas for receive operations provides receive diversity. The antenna selection circuit 25 may select either one of the antennas 30 and 40 for use as the primary transmit/receive antenna. The other of the antennas 30 or 40 may be used as a second receive antenna when operating in diversity mode.

When the wide area transceiver 15 and auxiliary receiver 20 are being used simultaneously, the auxiliary receiver 20 provides signal quality measurements to the antenna selection circuit 25. The signal measurements may, for example, comprise signal strength measurements, e.g., received signal strength indication (RSSI) measurements. In other embodiments, the signal quality measurements may comprise signal-to-noise ratios (SNRs) or signal-to-interference-plus-noise ratios (SINRs). During the antenna selection process, the auxiliary receiver 20 may switch antennas and provide RSSI measurements to the antenna selection circuit 25 for each of the available antennas. The antenna selection circuit 25 may then select, for the auxiliary receiver 20, the antenna 30, 35, or 40 that provides the best signal quality for the auxiliary receiver 20, e.g., highest RSSI.

In the case where antenna 35 is selected for the auxiliary receiver 20, the antenna selection circuit 25 may select either one of the remaining antennas 30, 40 as the primary transmit/receive antenna for the wide area transceiver 15. The other antenna 30 or 40 may be used as a second receive antenna for the wide area transceiver 15 in a diversity mode. In the case where antenna 30 or 40 is selected for the auxiliary receiver 20, the antenna selection circuit 25 must use the other one of the antennas 30 or 40 as the primary transmit/receive antenna for the wide area transceiver 15. In this case, the wide area transceiver 15 uses only one antenna.

Figure 4:
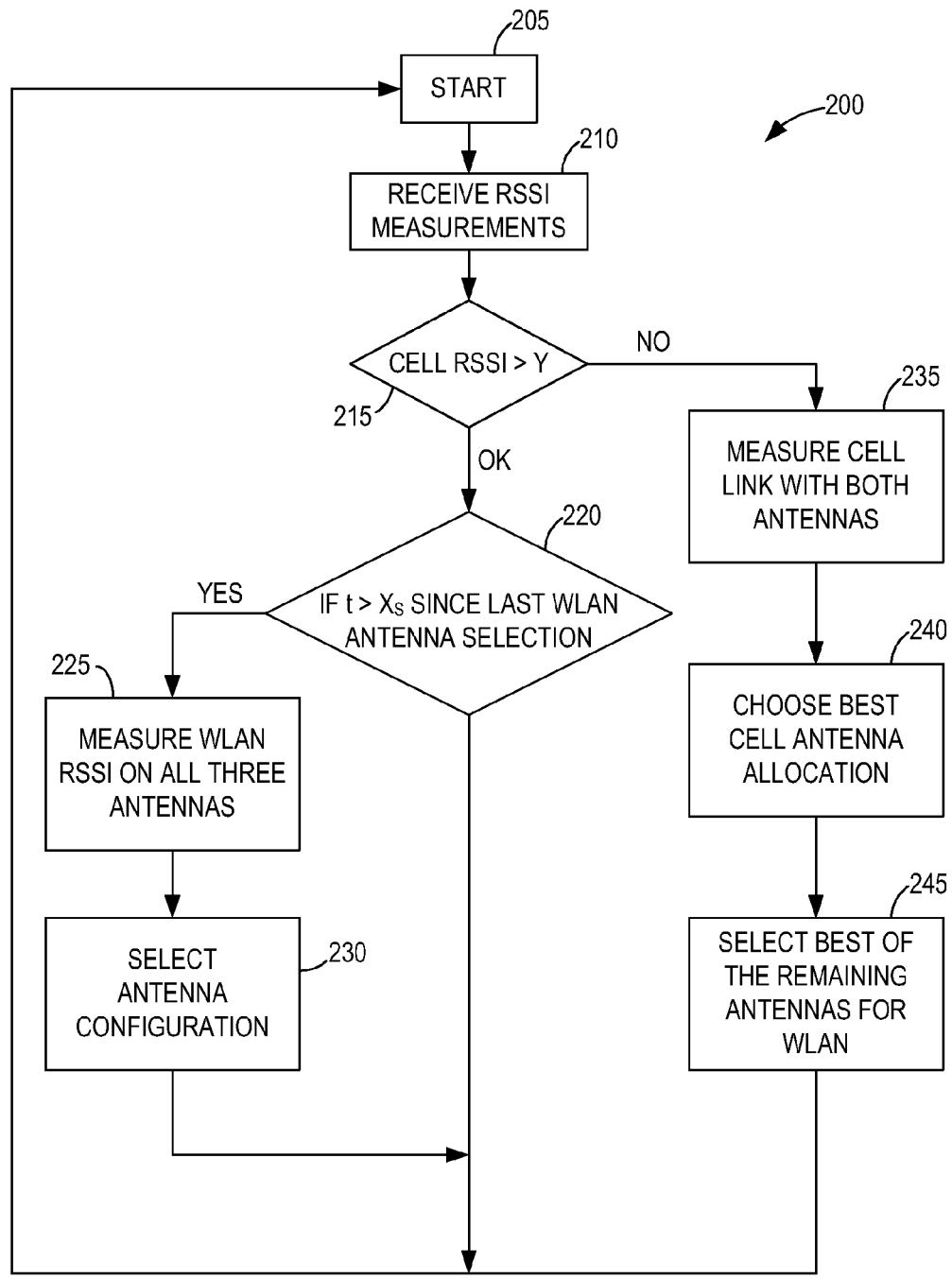
FIG. 4 illustrates an exemplary antenna selection procedure implemented in the second embodiment.

FIG. 4 illustrates an exemplary antenna selection procedure 200 implemented by the antenna selection circuit 25 in the first embodiment shown in FIG. 3. The procedure starts (block 205) when the wide area transceiver 15 and auxiliary receiver 20 are being used simultaneously. The antenna selection circuit 25 periodically receives RSSI or other signal quality measurements from the wide area transceiver 15 and auxiliary receiver 20 (block 210). The antenna selection circuit 25 compares the RSSI of the wide area transceiver 15 to a threshold Y (block 215). In some embodiments, the threshold Y may represent the minimum RSSI needed for camping on a serving cell. In other embodiments, the threshold Y may be varied based on the user scenario. For example, the user is streaming video from a cellular network and retransmitting the video to a TV, then Y should be set to provide enough throughput for the wide area transceiver 15. In this case, the threshold Y will be greater than the minimum value required for camping. If the RSSI is above the threshold, the antenna selection processor 25 then determines whether it is time to make a new antenna selection (block 120). For example, the antenna selection circuit 25 may be configured to select a new antenna configuration at a periodic interval on the order of once every few seconds. If the time has arrived for selecting a new antenna configuration, the antenna selection circuit 25 requests the auxiliary receiver to perform RSSI measurements using all three available antennas (block 225). The RSSI measurements should be made while the wide area transceiver is transmitting. After receiving the RSSI measurements from the auxiliary receiver, the antenna selection circuit 25 selects an antenna configuration (block 230). In one exemplary embodiment, the antenna selection circuit 25 selects the antenna configuration that provides the highest RSSI for the auxiliary receiver.

If, at block 215, the RSSI is below the threshold Y, the antenna selection circuit requests the wide area transceiver 15 provide a link quality measurement for both of antennas 30 and 40 (block 235). The antenna selection circuit 25 then selects the antenna 30 or 40 that provides the best link quality as the primary transmit/receive antenna (block 240). After selecting the primary transmit/receive antenna for the wide area transceiver, the antenna selection circuit 25 may select either one of the remaining antennas for the auxiliary receiver 20 (block 245). In the case where the antenna selection circuit chooses antenna 35 for the auxiliary receiver 20, the other one of the antennas 30 or 40 not selected for use as the primary transmit/receive antenna may be used a second receive antenna in diversity mode. In the case where the antenna selection circuit 25 chooses one of antennas 30 or 40 for the auxiliary receiver, the wide area transceiver is limited to single antenna node, i.e. non-diversity mode.

The antenna selection that provides the best isolation for the auxiliary receiver 20 might degrade the link quality for the wide area transceiver 15. However, gaining antenna isolation between wide area transceiver 15 and the auxiliary receiver 20 could, in certain operating scenarios, be of much higher importance than a slight degradation of the wide area link performance. An improvement in wide area to auxiliary antenna isolation could mean that auxiliary receiver 20 goes from heavy desensitization to having the majority of the channels unaffected. Such a gain in isolation could mean that wide area bands do not have optimum antenna allocation, but that is of secondary importance in this case. This is true for the wide area bands which use frequencies close to the auxiliary receiver 20 frequency band.

For other wide area bands, where coexistence is not deemed an issue, this type of antenna allocation is not necessary and can be switched off in order to let the wide area transceiver 15 have precedence and get the best link quality possible. This feature can, of course, be disabled when not using both the wide area transceiver 15 and auxiliary receiver 20 simultaneously. The antenna selection procedure as herein described is beneficial for use cases like WIFI direct and WIFI display, where wide area transceiver 15 and auxiliary receiver 20 are active with high throughput demands.

Figure 5:
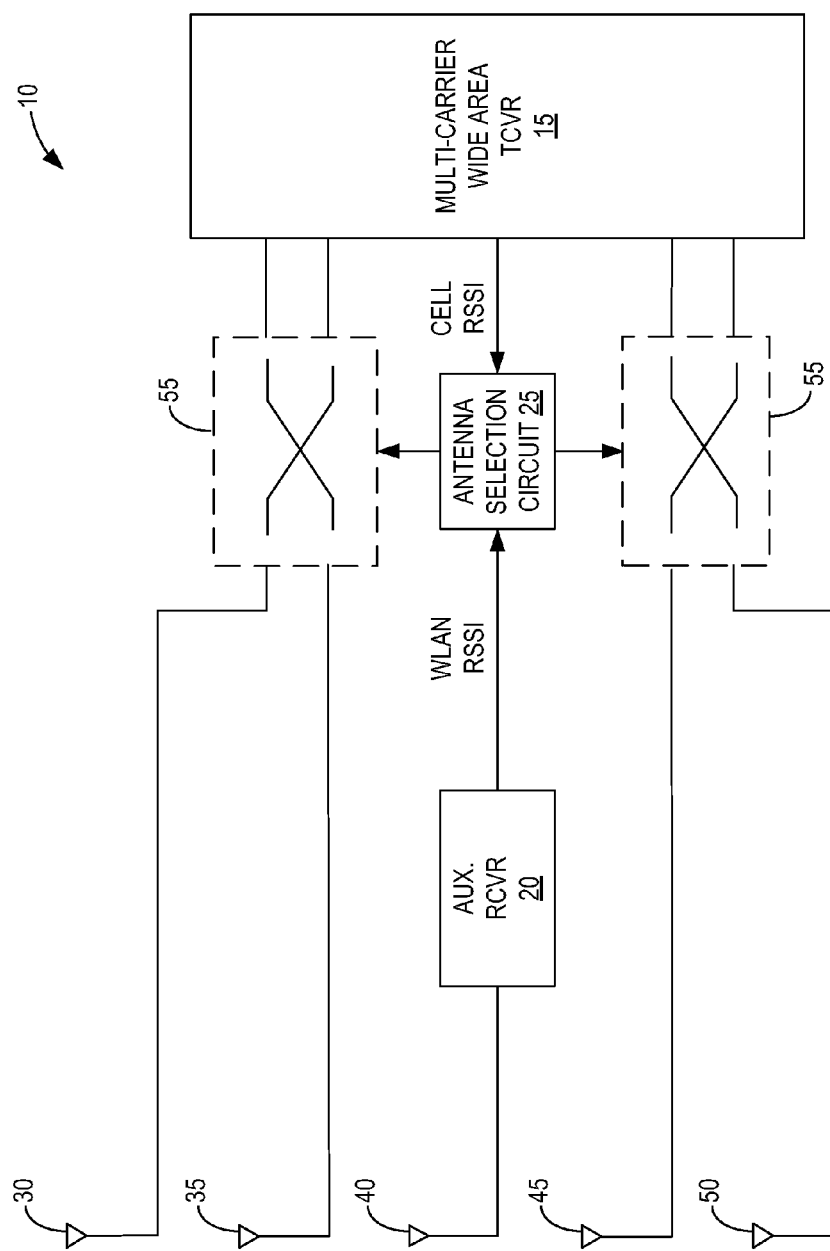
FIG. 5 illustrates an exemplary wireless communication device according to a third embodiment of the invention.

FIG. 5 illustrates a multi-carrier wireless communication device 10 according to a third embodiment of the invention. The embodiment shown in FIG. 5 is similar to the previous embodiments and, therefore, similar reference numbers are used to indicate similar components. The wireless communication device 10 comprises a multi-carrier wide area transceiver 15, an auxiliary receiver 20, and an antenna selection circuit 25. The wide area transceiver 15 may, for example, comprise a cellular transceiver with multi-carrier capabilities and configured to operate according to LTE, WCDMA, or another wireless communication standard. The auxiliary receiver 20 may, for example, comprise a wireless local area network (WLAN) receiver configured to operate according to the 802.11 family of standards, a BLUETOOTH receiver, a Global Positioning System (GPS) receiver, or near field communications (NFC) receiver. The wide area transceiver 15 couples to both antennas 30 and 40 via switch 55. The auxiliary transceiver 20 may be part of a transceiver unit. The multi-carrier wide area transceiver 15 includes two transmit/receive chains. One transmit/receive chain operates at a first carrier frequency and couples to antennas 30 and 35. The other transmit/receive chain operates at a second carrier frequency and couples to antennas 45 and 50. The auxiliary receiver 20 couples to antenna 40. The antenna selection circuit 25 receives signal quality measurements from the wide area transceiver 15 and auxiliary receiver 20 and determines an antenna configuration that provides the best isolation for the auxiliary receiver 20. The antenna selection circuit 25 may be implemented, for example, by a microprocessor or other processing circuit present in the mobile communication device 10.

In the embodiment shown in FIG. 5, the antenna selection for the auxiliary receiver 20 is fixed. The wide area transceiver 15 uses two antennas for each carrier. One carrier uses antennas 30 and 35, while the other carrier uses antennas 45 and 50. For each carrier, the antenna selection circuit 25 selects one of the antennas as the primary transmit/receive antenna and the other as the second receive antenna for diversity operation. When the wide area transceiver 15 and auxiliary receiver 20 are being used simultaneously, the wide area transceiver 15 and auxiliary receiver 20 provides signal quality measurements to the antenna selection circuit 25. The signal quality measurements may, for example, comprise signal strength measurements, e.g., RSSI measurements. In other embodiments, the signal quality measurements may comprise SINR measurements or SNR measurements. During the antenna selection process, the wide area transceiver 15 may alternatively switch transmit antennas for each carrier so that RSSI measurements can be obtained for each antenna configuration. Four different antenna configurations are possible. The antenna selection circuit 25 may select the antenna configuration that provides the best signal quality, e.g. highest RSSI, as the transmit antenna for the wide area transceiver 15.

The antenna selection circuit 25 uses an antenna selection as procedure as shown in FIG. 2. In this case, the antenna selection circuit 25 selects a pair of antennas to use as transmit antennas on the first and second carriers respectively. The pair that provides the best RSSI for the auxiliary should be selected.

Figure 6:
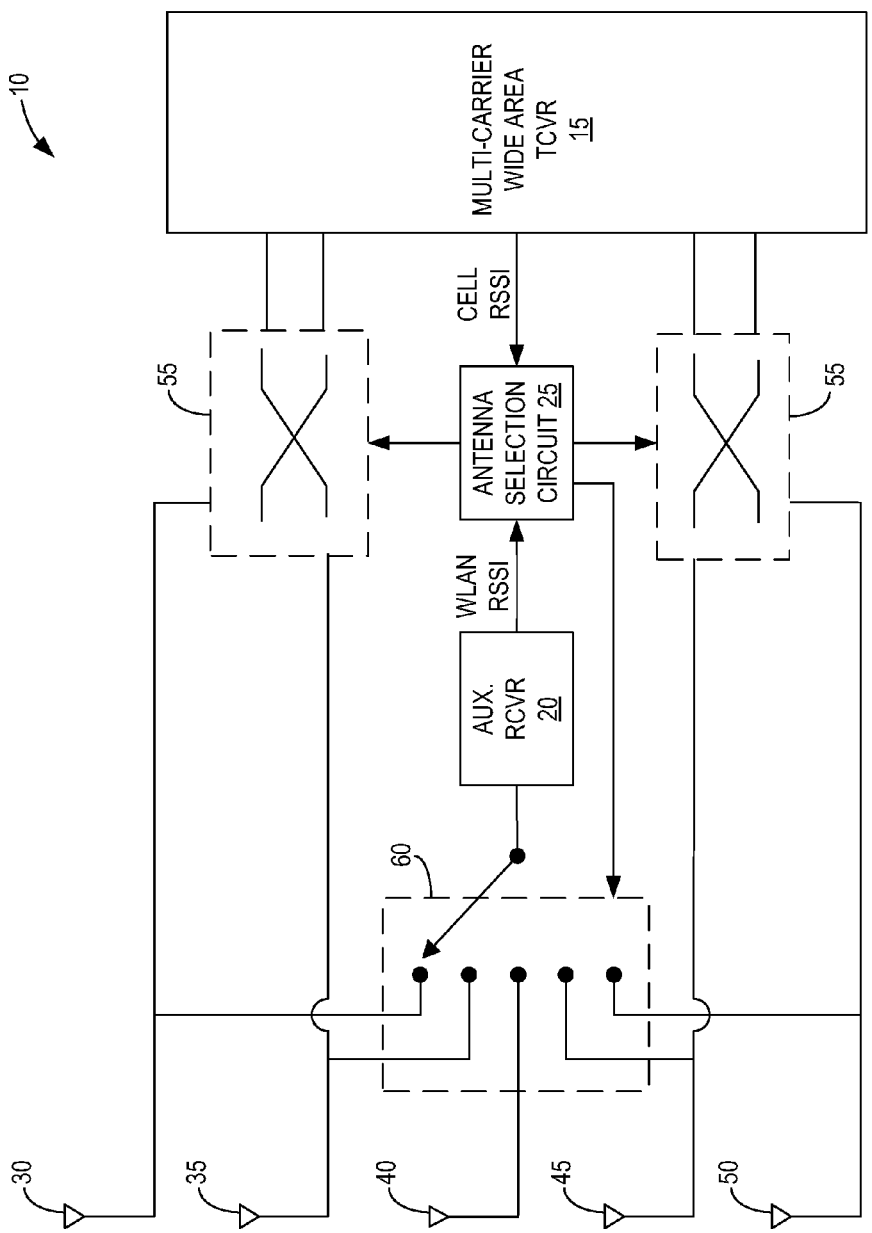
FIG. 6 illustrates an exemplary wireless communication device according to a fourth embodiment of the invention.

FIG. 6 illustrates a multi-carrier wireless communication device 10 according to a fourth embodiment of the invention. The embodiment shown in FIG. 5 is similar to the previous embodiments and, therefore, similar reference numbers are used to indicate similar components. The wireless communication device 10 comprises a multi-carrier wide area transceiver 15, an auxiliary receiver 20, and an antenna selection circuit 25. The wide area transceiver 15 may, for example, comprise a cellular transceiver with multi-carrier capabilities and cconfigured to operate according to LTE, WCDMA, or another wireless communication standard. The auxiliary receiver 20 may, for example, comprise a wireless local area network (WLAN) receiver configured to operate according to the 802.11 family of standards, a BLUETOOTH receiver, a Global Positioning System (GPS) receiver, or near field communications (NFC) receiver. The wide area transceiver 15 couples to both antennas 30 and 40 via switch 55. The auxiliary transceiver 20 may be part of a transceiver unit. The multi-carrier wide area transceiver 15 includes two transmit/receive chains. One transmit/receive chain operates at a first carrier frequency and couples to antennas 30 and 35. The other transmit/receive chain operates at a second carrier frequency and couples to antennas 45 and 50. The auxiliary receiver 20 may couple to any one of the antennas 30, 35, 40, 45, and 50. The antenna selection circuit 25 receives signal quality measurements from the wide area transceiver 15 and auxiliary receiver 20 and determines an antenna configuration that provides the best isolation for the auxiliary receiver 20. The antenna selection circuit 25 may be implemented, for example, by a microprocessor or other processing circuit present in the mobile communication device 10.

In the embodiment shown in FIG. 6, the auxiliary receiver 20 uses a single transmit/receive antenna. The antenna selection circuit 25 may select any one of the five available antennas 30, 35, 40, 45, or 50 for use by the auxiliary receiver 20. The wide area transceiver 15 uses two antennas for each carrier. One carrier uses antennas 30 and 35, while the other carrier uses antennas 45 and 50. For each carrier, the antenna selection circuit 25 selects one of the antennas as the primary transmit/receive antenna and the other as the second receive antenna for diversity operation. When the wide area transceiver 15 and auxiliary receiver 20 are being used simultaneously, the auxiliary receiver 20 provides signal quality measurements to the antenna selection circuit 25. The signal quality measurements may, for example, comprise signal strength measurements, e.g., RSSI measurements. In other embodiments, the signal quality measurements may comprise SINR measurements or SNR measurements. During the antenna selection process, the wireless transceiver 20 may switch antennas and provide RSSI measurements to the antenna selection circuit 25 for each of the available antennas. The antenna selection circuit may select the antenna 30, 35, 40, 45, or 50 that provides the best signal quality, e.g., highest RSSI.

In the case where antenna 40 is selected for the auxiliary receiver 20, the antenna selection circuit 25 may select one of antennas 30 or 35 as the primary transmit receive antenna for the first carrier, and one of antennas 45 or 50 as the primary transmit/receive antenna for the second carrier. The other one of the antennas 30 or 35 for the first carrier, and 45 or 50 for the second carrier, may be used as a second receive antenna in diversity mode.

In the case where one of antennas 30 or 35 is selected for the auxiliary receiver 20, the other one of antennas 30 or 35 is selected as the primary transmit/receive antenna for the first carrier. Thus, the first carrier is limited to single antenna operation. The antenna selection circuit 25 may select either one of antennas 45 or 50 as the primary transmit/receive antenna for the second carrier.

In the case where the antenna selection circuit 25 selects one of antennas 45 or 50 for the auxiliary receiver 20, the antenna selection circuit 25 must use the other one of the antennas 45 or 50 as the primary transmit/receive antenna for the second carrier. In this case, the second carrier is limited to single antenna operation. The antenna selection circuit 25 may select either one of antennas 30 or 35 as the primary transmit/receive antenna for the second carrier.

The antenna selection circuit 25 uses an antenna selection as procedure as shown in FIG. 4. It will be noted that, for each antenna selection for the auxiliary receiver 20, multiple antenna configurations for the wide area transceiver 15 are possible. If the antenna selection circuit 25 selects antenna 40 for the auxiliary receiver 20, there are four possible antenna configurations for the wide area transceiver 15. If the antenna selection circuit 25 selects one of antennas 30 or 35 for the auxiliary receiver 20, there are two possible antenna configurations for the wide area transceiver 15. Similarly, if the antenna selection circuit 25 selects one of antennas 45 or 50 for the auxiliary receiver 20, there are two possible antenna configurations for the wide area transceiver 15. During the antenna selection process, the antenna selection circuit 25 should measure the RSSI for the auxiliary receiver 20 for each of the possible antenna configurations and select the one that provides the best RSSI for the auxiliary receiver 20.

The present invention provides a simple method for improving coexistence of different radio technologies in mobile communication device. By switching antenna assignments, receiver desensitization can be minimized. The present invention is easy to implement and does not require any additional hardware other than what is typically present in a mobile communication device. The antenna selection algorithms can be implemented in software using measurements, e.g. RSSI, that are already being collected for other purposes.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of antenna selection in a wireless communication device having a wide area transceiver, an auxiliary receiver, and a plurality of selectable antennas, said method comprising:
    measuring link quality for each of two or more antennas used by the auxiliary receiver by:
        obtaining first link quality measurements from the wide area transceiver and the auxiliary receiver for a first antenna configuration having a first antenna as a primary antenna;
        swapping the first antenna configuration with a second antenna configuration having a second antenna as the primary antenna;
        obtaining second link quality measurements from the wide area transceiver and the auxiliary receiver for the second antenna configuration;
    if each of the first and second link quality measurements exceed a predetermined threshold, selecting an antenna configuration that provides the highest link quality for the auxiliary receiver; and
    if either one or both of the first and second link quality measurements do not exceed the predetermined threshold, selecting an antenna configuration that provides the highest link quality for the wide area transceiver.

2. The method of claim 1 wherein selecting an antenna configuration for the wide area transceiver comprises:
    selecting at least one antenna for use by the auxiliary receiver; and
    selecting a transmit antenna for the wide area transceiver from the remaining antennas not selected for use by the auxiliary receiver.

3. The method of claim 1 wherein the wide area transceiver comprises a multicarrier transceiver and wherein selecting an antenna configuration for the wide area transceiver comprises selecting a transmit antenna for each carrier.

4. A wireless communication device comprising:
    a wide area transceiver;
    a auxiliary receiver;
    a plurality of antennas for use by said auxiliary receiver and said wide area transceiver; and
    an antenna selection circuit for selecting an antenna configuration for said auxiliary receiver and said wide area transceiver, said antenna selection circuit being configured to:
        measure a link quality for each of two or more of antennas used by the auxiliary receiver by:
            obtaining first link quality measurements from the wide area transceiver and the auxiliary receiver for a first antenna configuration having a first antenna as a primary antenna;
            swapping the first antenna configuration with a second antenna configuration having a second antenna as the primary antenna; and
            obtaining second link quality measurements from the wide area transceiver and the auxiliary receiver for the second antenna configuration;
        if each of the first and second link quality measurements exceed a predetermined threshold, select an antenna configuration for the wide area transceiver that provides the highest link quality for the auxiliary receiver; and
        if either one or both of the first and second link quality measurements do not exceed the predetermined threshold, select an antenna configuration that provides the highest link quality for the wide area transceiver.

5. The wireless communication device of claim 4 wherein the antenna selection circuit is further configured to select an antenna configuration for the wide area transceiver by:
    selecting at least one antenna for use by the auxiliary receiver; and
    selecting a transmit antenna for the wide area transceiver from the remaining antennas not selected for use by the auxiliary receiver.

6. The wireless communication device of claim 4 wherein the wide area transceiver comprises a multicarrier transceiver and wherein the antenna selection circuit is configured to select an antenna configuration for the wide area transceiver by selecting a transmit antenna for each carrier.

\* \* \* \* \*